Patented Oct. 18, 1938

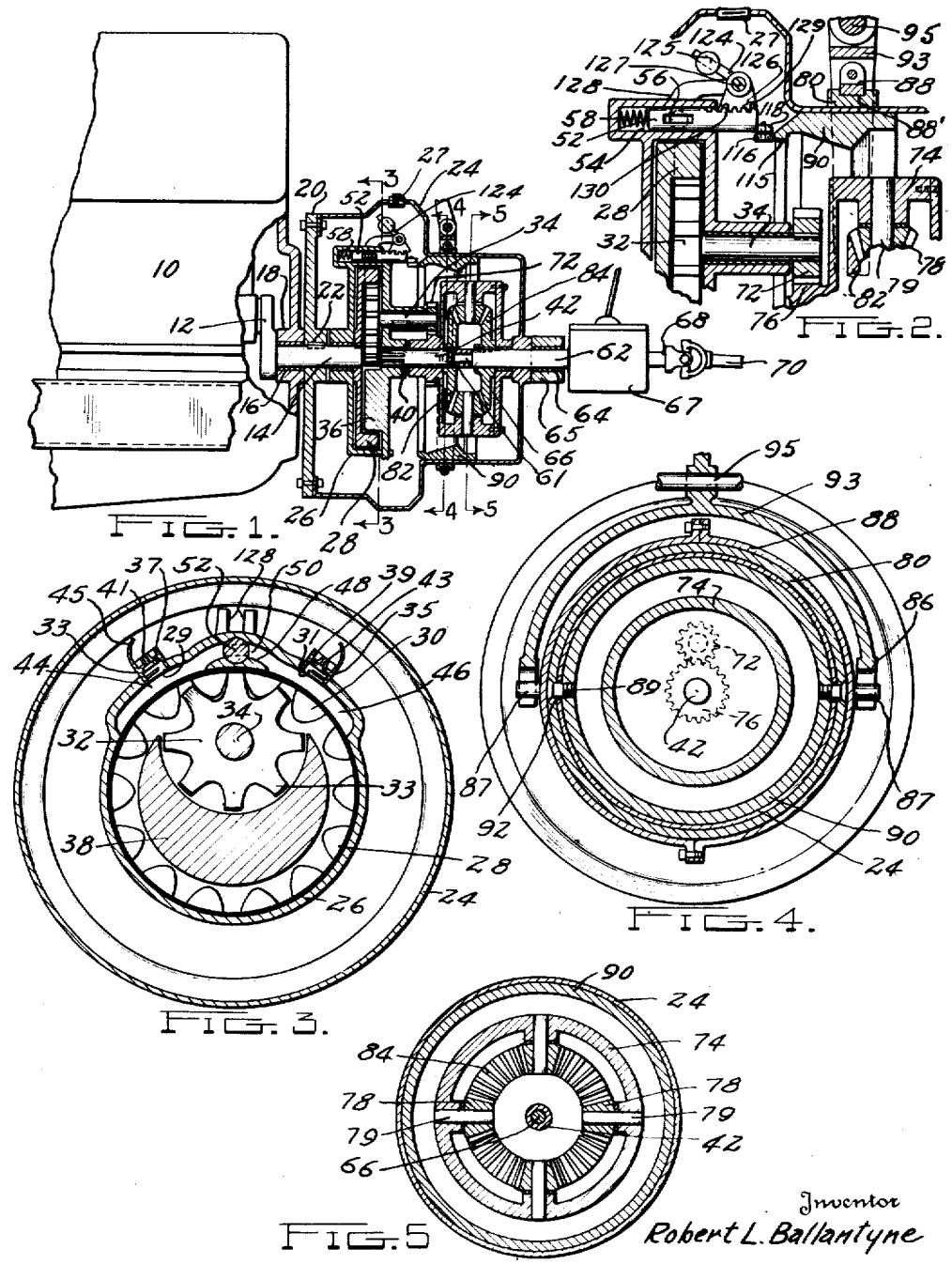

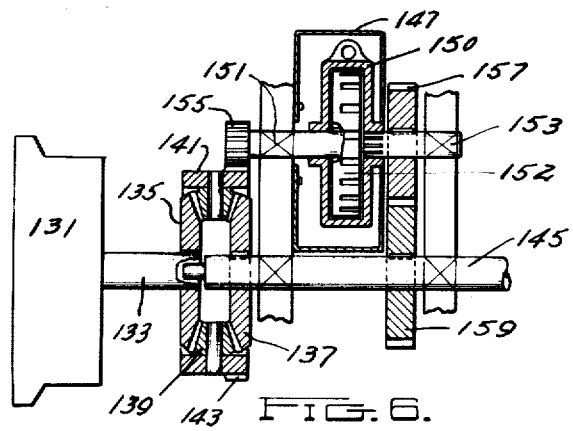
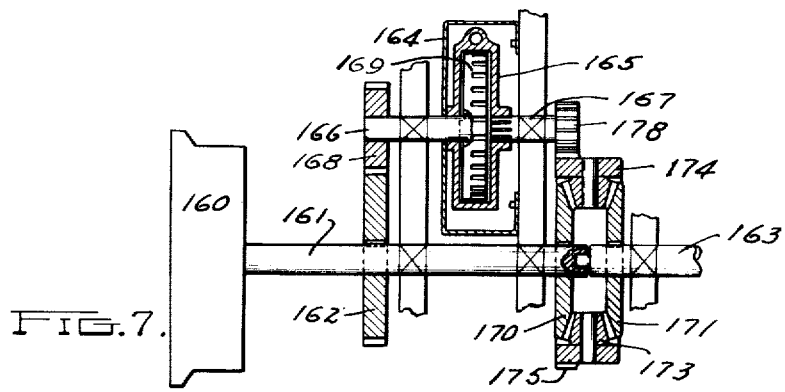
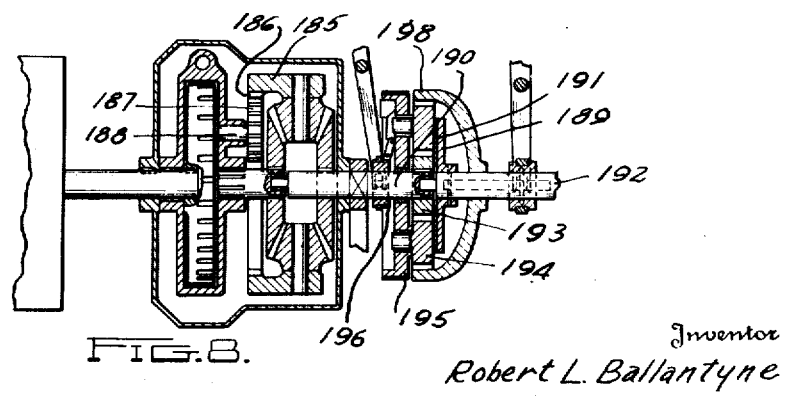

2,133,276

UNITED STATES PATENT OFFICE 2,133,276

POWER TRANSMISSION

Robert L. Ballantyne, Perrysburg, Ohio

Application October 16, 1935, Serial No. 45,287

8 Claims. (Cl. 74—293)

This invention relates to variable speed power transmission apparatus and is more particularly directed to transmission mechanism for transmitting power from a driving shaft to a driven shaft.

An object of the invention is the provision of a simplified variable speed power transmission of this character which is efficient in operation and simple in construction.

The invention contemplates means to vary the driving relation between the driving and driven shafts so that the speed of the driven shaft with respect to the driving shaft is varied in response to the load resistance.

A further object of the invention resides in the provision of a substantially unitary hydraulic clutch and gear arrangement for varying the driving ratio between the driving and driven shafts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary detail sectional view illustrating the invention as incorporated for use with an internal combustion engine for automotive vehicles;

Figure 2 is an enlarged fragmentary detail view of a portion of the mechanism shown in Figure 1;

Figure 3 is a sectional detail taken substantially on a line 3—3 of Figure 1;

Figure 4 is a sectional detail taken substantially on a line 4—4 of Figure 1;

Figure 5 is a sectional detail taken substantially on a line 5—5 of Figure 1;

Figures 6, 7 and 8 are diagrammatic illustrations of other forms of the invention.

The invention has been illustrated as incorporated for use as a power transfer mechanism between internal combustion engines and propeller or drive shafts of automotive vehicles, but it is to be understood that I contemplate its use wherever the same may be found to have utility.

Referring to the drawings and particularly Figures 1 to 5 thereof, a form of the invention which may be preferred, has been illustrated wherein an internal combustion engine casing 10 supports a crank shaft 12 formed with an extension 14. Extension 14 is suitably journalled in a bearing 16 carried by an enlarged portion 18 of the casing 10, and has a rotatable member or flywheel 20 keyed or otherwise secured thereto as at 22. Flywheel 20 may be of the usual form or may be a disc of desired weight to which is preferably removably secured a casing 24 of comparatively light weight material as for example sheet metal. Suitably journalled on extension 14 adjacent the flywheel 20, is a casing 26 which is capable of rotation with respect thereto. Within casing 26 is a gear or rotor 28 having internal teeth 30, the rotor 28 being suitably secured to the extremity of extension 14 for rotation therewith. In mesh with teeth 30 of gear 28 are the teeth 33 of an idler or driven gear 32 which is mounted upon a shaft 34 carried by an end or head portion 36 of the casing 26. Head 36 is formed with an inwardly extending projection 38 of crescent shape which divides the casing into two sections. The head 36 is provided with a splined opening 40 within which is positioned a shaft 42 axially aligned with extension 14 of the crankshaft 12.

As particularly shown in Figure 3, the casing 26 is formed with enlarged chamber portions 44 and 46 between which is positioned a wall 48 having an opening 50 therein communicating with chambers 44 and 46. Projecting through the wall 48 substantially at right angles to the opening 50 is a valve member 52 slidably mounted in an opening 54. Valve 52 is formed with an opening therethrough or may be slotted as at 56 providing a passage between chambers 44 and 46 when the slot 56 is in register with the opening 50. A resilient member or spring 58 is positioned between the casing 26 and valve 52 which tends to hold the latter in open position, or so that slot 56 cooperates with opening 50.

Each of the casings 24 and 26 is adapted to hold fluid such as oil or the like, the outer casing 24 serving as a reservoir to supply fluid to casing 26 as will hereinafter appear.

The fluid in casing 26 is circulated through the spaces between the rotor 28, idler 32 and head 36 upon rotation of the rotor 28 and thus idler 32, the fluid passing through valve 52 when in open position, due to the meshing of teeth 30 and 33 which force the fluid into chamber 46 when the rotor is driven in a clockwise direction as viewed in Figure 3. When valve 52 is closed however, the circulation of fluid ceases and the mechanism becomes in effect a unitary structure and casing 26 being free upon extension 14 is driven by and rotates with the rotor 28. Thus the fluid becomes a cushion between the casing, rotor and idler and a substantially positive drive is provided between crank shaft 12 and driven shaft 42.

The mechanism thus far described simulates a rotary pump structure wherein the rotor 28 is driven by the engine crank shaft 12, the casing 26 serving as a power transfer to a driven shaft 42 through the medium of the idler gear 32 which meshes with the teeth of the rotor and which is locked thereto when the valve 52 is closed to stop the free passage of fluid through chambers 46 and 44. This arrangement is in effect a fluid clutch serving as a means for coupling together of the driving and driven shafts as will hereinafter appear.

Casing 24 is provided with a plug 27 which is removable for the injection of fluid to the interior of the casing to compensate for any leakage or waste. In order that the fluid, preferably an oil of desired quality may be supplied to casing 26, openings 29 and 31 are provided in casing 26 adjacent chambers 44 and 46. Within openings 29 and 31 are valve mechanisms 33 and 35 provided with seats 37 and 39 to receive the head portions of valves 41 and 43. Each member 33 and 35 is formed with an extended portion 45 of scoop shape which serves to "pickup" the oil as casing 26 rotates, the suction created in chamber 44 being sufficient to open valve 41 when the casing is rotating clockwise, or in chamber 46 to open valve 43 when the casing is rotating counterclockwise, as viewed in Figure 3. Such an arrangement maintains the desired supply of fluid in the casing 26.

In axial alignment with shaft 42 is a shaft 62 suitably journalled in a bearing 64 carried by a convenient bracket 65. Shaft 62 is provided with a reduced portion 66 adapted to be received within an opening 61 provided in the end of shaft 42. The other end of shaft 62 extends into a casing 67 which contains a reverse gear mechanism of suitable form. The gearing in casing 67 is provided with a connecting element 68 forming a part of a universal joint or other suitable connection to a propeller or drive shaft 70 which in turn is suitably connected to the driving wheels of the vehicle (not shown).

In order that shaft 62 and thus shaft 70 may be driven at a low speed a differential mechanism is provided which may be driven through the medium of gear 72 carried by the stub shaft 34 driven by the idler gear 32. The differential has been illustrated as including a ring 74 driven by means of gear 76 formed integral therewith or suitably secured thereto. Ring 74 carries a plurality of pinions 78 which are mounted in any suitable manner upon stub shafts 79. The pinions 78 are in constant mesh with bevel gears 82 and 84 mounted respectively upon shafts 42 and 62 and adapted for rotation therewith. Thus shaft 62 is capable of being rotated either through shaft 42, gear 82, pinions 78 and gear 84 when valve 52 is closed and casing 26 is rotating, or through gears 72 and 76, ring 74, pinions 78 and gear 84, when valve 52 is open and casing 26 is substantially stationary, or through both of these sets of gearing as will hereinafter appear.

Although a bevel gear type of differential mechanism has been chosen for illustration it is to be understood that planetary gearing may be utilized, in which event, a sun gear could be substituted for the bevel gear 82, planet gears for the pinions 78 and an internally toothed ring gear for the bevel gear 84. If such an arrangement is utilized gear 72 on stub shaft 34 would be one of the planet gears.

In order that the ring 74 and thus shaft 62 may be selectively driven by gear 72, a form of manually operable control has been illustrated in Figures 1, 2 and 4. Suitably carried upon an external cylindrical surface of casing 24 is a ring 80 slidable with respect thereto in a suitable manner, such as by means of a yoke member 93, pivoted as at 95. A split ring 88 is connected to the enlarged extremities 86 of the yoke 93 through the medium of pins 87 provided on ring 88 which is positioned in a slot 88' in ring 80. Thus by rocking the yoke 93 upon pivot 95, ring 88 and thus ring 80 are moved longitudinally upon the casing 24. Ring 80 is suitably pinned or otherwise secured as at 89 to an internal ring 90, slots 92 being provided in the casing 24 to permit movement of the connecting elements 89 with respect to the casing. Rings 80 and 90 are of sufficient width to cover slots 92 throughout their full range of movement and thus prevent the escape of oil from casing 24.

Ring 90 is formed with an annular projection 115 which is engaged by a roller 116 carried by an extension 118 on valve member 52. Valve 52 is adapted to be held in open position by means of spring 58 which also serves to continuously urge roller 116 into engagement with projection 115. Thus manipulation of ring 80 and thus ring 90 moves valve 52 into and out of open position. A governor or automatic control has also been provided to operate valve 52 and may take the form of a pivoted member 124 provided with a weight 125 adjacent its outer extremity and a gear sector 126 on its inner extremity. Member 124 is pivoted at 127 between the weight 125 and sector 126 to a suitable bracket 128 formed on casing 26. The teeth 129 of sector 126 are in engagement with teeth 130 provided in the valve 52. Thus rotation of casing 26 will affect the position of weight 125 and vary the position of valve 52, and as casing 26 increases in speed, the centrifugal force causes valve 52 to move toward closed position.

The arrangement is such, that when it is desired to apply direct drive to the shaft 70 through shaft 42, the valve 52 is closed so that the rotor 28, idler 32 and casing 26 rotate as a unit. Thus, ring 90 is moved to the extreme left as viewed in Figure 2 or into direct drive position and roller 116 rides upon surface 115 of the ring 90 which maintains the valve 52 in closed position. When it is desired to return the elements to neutral position, ring 90 is manipulated so that surface 115 moves away from roller 116 and spring 58 moves valve 52 into open position, permitting idler gear 32 to rotate shaft 34 and impart rotation to ring 74, shaft 70 becoming free.

Low gear is obtained when ring 90 is in the position illustrated in Figures 1 and 2. Thus rotation of crank shaft 12 rotates the rotor 28 and idler 32 on shaft 34. The shaft 34 in turn drives gear 72, and as the driven shafts 62 and 70 are stationary, gear 72 will start to walk around gear 76. As valve 52 moves toward closed position the resistance between rotor 28 and idler 32 increases and gear 72 applies additional driving force to gear 76 and ring 74. Shaft 42, being driven by the casing 26, imparts motion to bevel gear 82 in the direction of rotation of casing 26. Gear 84, being fixed upon shaft 62 is also stationary and thus the ring 74 starts to rotate due to its connection to pinions 78 which are driven in this instance, by bevel gear 82. Gear 72 will tend to rotate ring 74 faster than it is being rotated through bevel gear 82, with the result that the bevel gear 84 and shaft 82 are rotated in the direction of rotation of the crank shaft 12. The resultant effect of the increased speed of the gear 72 and the rotation of casing 26 is to drive the differential mechanism with increasing speed which is in turn imparted to the driven shafts 62 and 70. It is to be noted that during this driving action, casing 26 and the differential mechanism are rotating and gear 72 tends to drive the differential faster.

It is to be further noted that in addition to the walking action of gear 72 around gear 76 that although valve 52 is initially in open position, the opening restricts the fluid flow sufficiently to drive the casing 26 slowly in the direction of crank shaft rotation. Thus throughout the operation of the above mechanism the same is being rotated substantially as a unit although there is relative movement between the several elements, during various periods of operation. This arrangement adds materially to the flexibility of the device, much of the shock of initial movement of the driving action being eliminated, and tends to reduce materially the "back lash" present in conventional transmissions.

Direct drive is obtained either manually or automatically by closing valve 52 through the movement of ring 90 toward casing 26 or by the centrifugal force upon the weighted sector 124. Thus motion is initiated by means of the rotation of ring 74 and as the load decreases the valve 52 may be closed either manually or automatically to drive shaft 62 directly from shaft 14 through the casing 26.

To reverse the direction of the driven or propeller shaft 70, a reverse gear mechanism of conventional form may be utilized in which instance shaft 62 is preferably driven in the manner above described in connection with low gear.

In the form of the invention above described the arrangement is such that the idler gear 32 is connected to the ring 74 while the casing 26 is connected to the bevel gear 82. However, a number of other driving connections may be made and several arrangements have been illustrated in Figures 6, 7 and 8. In Figure 6, a flywheel 131 which may be the conventional flywheel of an internal combustion engine, is illustrated as driving a bevel 135 through the medium of a shaft 133. Bevel gear 135 forms a part of a differential mechanism including a bevel gear 137 pinions 139 and ring 141 having an external toothed portion 143. In this form of the invention the pump structure is mounted adjacent the driven shaft 145, and the exterior casing 147 is maintained stationary by securing the same to a suitable support. Casing 150 is carried by shaft 151 keyed or otherwise secured to rotor 152 and shaft 153 splined to the casing 150. On the outer end of shaft 151 is secured a gear 155 for engagement with the teeth 143 of ring 141. Shaft 153 carries a gear 157 in mesh with a gear 159 on shaft 145.

Thus, shaft 145 may be driven through the medium of shaft 133, bevel gear 135, pinion 139, bevel gear 137 when the pump is locked in a manner described in connection with Figures 1 to 6 to provide a direct drive. When it is desired to drive shaft 145 at low speed the drive is through bevel gear 135, bevels 139, ring 141, gear 155, rotor 152, casing 150, gear 157 and gear 159. In this instance a pump idler gear is not utilized except to control the rotation of casing 150 either permitting the casing to rotate freely or drive the same by locking the rotor 152 to the casing.

In Figure 7 the differential mechanism is positioned after the pump structure and the arrangement differs from that shown in Figure 6 in that a fly wheel 160 rotates shaft 161 to which is suitably keyed a gear 162 and bevel gear 170. A driven shaft 163 is journalled in the end of shaft 161 and carries a second bevel gear 171. Associated with the gevel gears 170 and 171 are pinion gears 173 carried by a ring 174 which is externally toothed as at 175. Connected between gear 162 and ring 174 is a pump arrangement which preferably includes outer casing 164 secured to a support to hold the casing stationary. Within casing 164 is a casing 165 suitably supported for rotation therein on shafts 166 and 167. Shaft 166 is provided with a gear 168 in mesh with gear 162 and a rotor 169 forming a part of the pump structure. Casing 165 is freely mounted on shaft 166, and may be rotated therewith or with respect thereto as will hereinafter appear. A second shaft 167 is preferably splined to the casing 165 and carries a gear 178 in mesh with the teeth 175 of ring 174. Thus, driven shaft 163 may be rotated either through the bevel gear 171, pinions 173, ring 174, gear 178, casing 165, gear 168, gear 162 and driving shaft 161, or through the differential mechanism and drive shaft 161. In this arrangement two units of the pump structure are utilized, the idler gear of the pump serving as the locking means between the casing 165 and rotor 169 as described in connection with Figure 6.

The arrangement shown in Figure 8 is inclusive of a pump and differential mechanism similar to that shown in Figures 1 to 5. The ring 185 however, being formed with an internal gear 186 with which meshes a gear 187 on an idler gear shaft 188. In this form of the invention shaft 190 carries a planetary gear mechanism provided with a clutch and a brake mechanism. Thus a driven shaft 192 is rotated in one direction through a sun gear 193 fixed to shaft 190, planet gears 194 carried by a brake housing 195 and operative elements 196 carried by the shaft 190. A clutch plate 189 carried on shaft 192 is provided with friction disc 191 for engagement with the sun and planet gears 193 and 194. Such an arrangement, with clutch engaged, stops the sun and planet gears and the ring 198 is rotated therewith which in turn rotates shaft 192. When the clutch is disengaged and the brake on, the planet gears rotate around the sun gear to drive the ring gear and shaft 192 in a direction opposite to that of shaft 190. With both the brake off and clutch disengaged the planet gears will rotate about the sun gear and within the ring gear without driving the latter.

From the foregoing description it is to be noted that a number of arrangements may be utilized without departing from the spirit of the invention and that I contemplate a transmission mechanism wherein a fluid pump or clutch is connected to differential gearing so that any one of the clutch units such as the rotor, idler or case cooperated with any one of the differential units such as the two bevel gears or ring gear to drive the same as herein set forth.

It is apparent that, within the scope of the invention, modifications and different arrangements may be made other than is herein disclosed, and the present disclosure is illustrative merely, the invention comprehending all variations thereof.

What I claim is:

1. In a power transmission, the combination of a rotatable housing; a drive shaft terminating therein; a casing mounted on said shaft for rotation thereon; a gear within said casing and fixed to said shaft; an idler gear in mesh with said gear; a shaft adapted to be driven by said casing; differential gearing between said idler gear and said driven shaft; and means to vary the speed of said driven shaft.

2. In a power transmission, the combination of a rotatable housing; a drive shaft; a casing mounted on said shaft for rotation thereon; fluid in said housing and said casing; a gear within said casing and fixed to said shaft; an idler gear in mesh with said gear; a shaft adapted to be driven by said casing; differential gearing between said idler gear and said driven shaft; and means to control the circulation of fluid in said casing to vary the speed of said driven shaft.

3. A power transmission including a rotatable housing, a drive shaft; a casing carried by said drive shaft; a driven shaft connected to said casing; fluid controlled gearing in said casing and associated with said drive shaft; differential gearing associated with said driven shaft; and means to control the circulation of fluid in said casing to vary the driving relation between said drive shaft and said driven shaft through said fluid controlled gearing.

4. In a transmission mechanism the combination of a driving shaft; a driven shaft; a casing adapted to contain a fluid; an internal gear in said casing and secured to said driving shaft; an idler gear in mesh with said internal gear; and differential gearing connected to said internal gear and said idler gear means to control the circulation of fluid in said casing to drive said driven shaft through said idler gear and said casing.

5. In a power transmission, the combination of a housing; a casing rotatable within said housing; a drive shaft; a driven shaft; an internal gear on said drive shaft within said casing; an idler gear in mesh with said gear; fluid in said casing; differential gearing adjacent said casing; means to drive said gearing from said casing and from said idler gear; and means to vary said driving relation by regulating the flow of fluid in said casing.

6. In a power transmission, the combination of a drive shaft; a casing mounted for rotation on said shaft; a gear within said casing and rotatable with said shaft; an idler gear in mesh with said gear; fluid in said casing and surrounding said gears; a shaft adapted to be driven by said casing; differential gearing between said idler gear and said driven shaft; and means to vary the speed of said driven shaft by regulating the flow of fluid in said casing.

7. In a power transmission, the combination of a housing; a drive shaft; a casing mounted on said shaft for rotation thereon; fluid in said casing; a gear within said casing and fixed to said shaft; an idler gear in mesh with said gear; a shaft adapted to be driven by said casing; differential gearing between said idler gear and said driven shaft; planetary gearing associated with said driven shaft; a second driven shaft; and means to change the direction of rotation of said second driven shaft.

8. In a power transmission, a housing; a drive shaft; a rotatable casing; a rotary gear train in said casing; differential gearing associated therewith; a plurality of shafts connecting said gear train to said differential gearing; a driven shaft; means to drive said driven shaft through said differential gearing by one or more of said shafts; a planetary gear train cooperating with said driven shaft; a second driven shaft; and means to change the direction of rotation of said second driven shaft.

ROBERT L. BALLANTYNE.

CERTIFICATE OF CORRECTION.

Patent No. 2,133,276.   October 18, 1938.

ROBERT L. BALLANTYNE.

It is hereby certified that error appears in the printed specification of the above numbered patent requiring correction as follows: Page 3, second column, line 8, for "gevel" read bevel; page 4, first column, line 33, claim 4, strike out the word "and" and insert the same before "means", line 35, same claim; and that the said Letters Patent should be read with this correction therein that the same may conform to the record of the case in the Patent Office.

Signed and sealed this 10th day of January, A. D. 1939.

Henry Van Arsdale (Seal)   Acting Commissioner of Patents.

of a rotatable housing; a drive shaft terminating therein; a casing mounted on said shaft for rotation thereon; a gear within said casing and fixed to said shaft; an idler gear in mesh with said gear; a shaft adapted to be driven by said casing; differential gearing between said idler gear and said driven shaft; and means to vary the speed of said driven shaft.

2. In a power transmission, the combination of a rotatable housing; a drive shaft; a casing mounted on said shaft for rotation thereon; fluid in said housing and said casing; a gear within said casing and fixed to said shaft; an idler gear in mesh with said gear; a shaft adapted to be driven by said casing; differential gearing between said idler gear and said driven shaft; and means to control the circulation of fluid in said casing to vary the speed of said driven shaft.

3. A power transmission including a rotatable housing, a drive shaft; a casing carried by said drive shaft; a driven shaft connected to said casing; fluid controlled gearing in said casing and associated with said drive shaft; differential gearing associated with said driven shaft; and means to control the circulation of fluid in said casing to vary the driving relation between said drive shaft and said driven shaft through said fluid controlled gearing.

4. In a transmission mechanism the combination of a driving shaft; a driven shaft; a casing adapted to contain a fluid; an internal gear in said casing and secured to said driving shaft; an idler gear in mesh with said internal gear; and differential gearing connected to said internal gear and said idler gear means to control the circulation of fluid in said casing to drive said driven shaft through said idler gear and said casing.

5. In a power transmission, the combination of a housing; a casing rotatable within said housing; a drive shaft; a driven shaft; an internal gear on said drive shaft within said casing; an idler gear in mesh with said gear; fluid in said casing; differential gearing adjacent said casing; means to drive said gearing from said casing and from said idler gear; and means to vary said driving relation by regulating the flow of fluid in said casing.

6. In a power transmission, the combination of a drive shaft; a casing mounted for rotation on said shaft; a gear within said casing and rotatable with said shaft; an idler gear in mesh with said gear; fluid in said casing and surrounding said gears; a shaft adapted to be driven by said casing; differential gearing between said idler gear and said driven shaft; and means to vary the speed of said driven shaft by regulating the flow of fluid in said casing.

7. In a power transmission, the combination of a housing; a drive shaft; a casing mounted on said shaft for rotation thereon; fluid in said casing; a gear within said casing and fixed to said shaft; an idler gear in mesh with said gear; a shaft adapted to be driven by said casing; differential gearing between said idler gear and said driven shaft; planetary gearing associated with said driven shaft; a second driven shaft; and means to change the direction of rotation of said second driven shaft.

8. In a power transmission, a housing; a drive shaft; a rotatable casing; a rotary gear train in said casing; differential gearing associated therewith; a plurality of shafts connecting said gear train to said differential gearing; a driven shaft; means to drive said driven shaft through said differential gearing by one or more of said shafts; a planetary gear train cooperating with said driven shaft; a second driven shaft; and means to change the direction of rotation of said second driven shaft.

ROBERT L. BALLANTYNE.

---

CERTIFICATE OF CORRECTION.

Patent No. 2,133,276.  October 18, 1938.

ROBERT L. BALLANTYNE.

It is hereby certified that error appears in the printed specification of the above numbered patent requiring correction as follows: Page 3, second column, line 8, for "gevel" read bevel; page 4, first column, line 33, claim 4, strike out the word "and" and insert the same before "means", line 35, same claim; and that the said Letters Patent should be read with this correction therein that the same may conform to the record of the case in the Patent Office.

Signed and sealed this 10th day of January, A. D. 1939.

Henry Van Arsdale (Seal)  Acting Commissioner of Patents.